United States Patent [19]

Goldstein et al.

[11] Patent Number: 5,060,995

[45] Date of Patent: Oct. 29, 1991

[54] SELF-LOCKING ADAPTOR FOR CONVERTING A POLE INTO A TOOL

[75] Inventors: Edward J. Goldstein; Richard A. Linn, both of Minneapolis, Minn.

[73] Assignee: Padco Plastics, Inc., Minneapolis, Minn.

[21] Appl. No.: 512,113

[22] Filed: Apr. 20, 1990

[51] Int. Cl.[5] ........................ B25J 1/00; E06B 9/26

[52] U.S. Cl. ........................ 294/19.1; 81/177.1; 160/178.1; 403/229

[58] Field of Search .................... 294/1.1, 3.6, 5.5, 15, 294/19.1, 19.2, 22–24, 26, 27.1, 61, 99.1, 167; 15/145, 147 R, 147 A, 229.5, 229.9; 24/457; 81/52, 53.1, 177.1, 177.6, 487, 488; 267/166, 170, 178, 179, 182; 403/229, 299, 307, 345; 160/176.1–178.1

[56] References Cited

U.S. PATENT DOCUMENTS

| | | | |
|---|---|---|---|
| 80,350 | 7/1868 | Hoffman | 294/19.1 X |
| 306,188 | 10/1884 | Strong | 294/19.1 X |
| 519,354 | 5/1894 | Sheppard | 294/19.1 X |
| 593,155 | 11/1897 | Buchanan | 294/24 |
| 1,875,376 | 9/1932 | Hamer et al. | 294/19.1 |
| 2,028,122 | 1/1936 | Floreth | 267/170 X |
| 2,063,583 | 12/1936 | Christy | 294/19.1 X |
| 2,084,617 | 6/1937 | Kehl | 294/19.1 X |
| 2,285,818 | 6/1942 | Kootz | 403/229 X |
| 2,542,665 | 2/1951 | Gustafson | 294/19.1 X |
| 3,182,960 | 5/1965 | French | 294/19.1 X |
| 3,323,826 | 6/1967 | Crowley | 294/19.1 |
| 3,936,088 | 2/1976 | Williams | 294/19.1 |
| 4,153,286 | 5/1979 | Piper et al. | 294/24 X |

FOREIGN PATENT DOCUMENTS

| | | | |
|---|---|---|---|
| 528058 | 7/1956 | Canada | 403/229 |
| 514007 | 12/1930 | Fed. Rep. of Germany | 403/229 |
| 27822 | of 1897 | United Kingdom | 294/19.1 |

*Primary Examiner*—Johnny D. Cherry

*Attorney, Agent, or Firm*—Jacobson & Johnson

[57] ABSTRACT

An adaptor for connection to the male threads on a cylindrical pole to convert the pole into a window pole for opening and closing blinds or the like wherein the adaptor comprises a resilient wire coil that has a stop to prevent rotation of the adaptor with respect to a pole in a first direction and a cantilevered positioned hook that provides a compressive force on the wire coil to prevent rotation of the adaptor in the opposite direction.

12 Claims, 1 Drawing Sheet

SELF-LOCKING ADAPTOR FOR CONVERTING A POLE INTO A TOOL

FIELD OF THE INVENTION

This invention relates generally to adaptors and, more specifically, to a self locking adaptor for converting an ordinary threaded broom handle into a tool for rotating the drive mechanisms that raise and lower window blinds or the like.

BACKGROUND OF THE INVENTION

The concept of a window pole with a hook on the end for use in raising and lowering windows or the like is old in the art. To raise and lower windows such as venetian blinds, the user generally inserts a window pole with a hook into an eyelet extending from the housing at the top of the venetian blind. The user then rotates the window pole and the hook to raise or lower the venetian blind. Since the eyelet is usually above the normal reach of a person, the hook is attached to the end of a long pole so the user can stand on the floor to raise and lower the blinds.

The present invention is directed toward a low cost, self-locking, screw-on adaptor that can quickly convert an ordinary broom handle into a window pole. By attaching the adaptor to the male threads on a broom handle, a user obtains a tool that can axially rotate the driving eyelet on the blind housing to open or close the blinds or the like. In order for the adaptor to perform preperly, the adaptor must lock itself in position on the threads so the adaptor does not rotate as a rotational force is applied to the window pole. The present invention provides a screw-on, self-locking adaptor with an outward extending eyelet hook. The invention can be quickly and efficiently rotated onto a threaded handle and once properly seated the adaptor locks in place to prevent further rotation of the hook with respect to the pole.

DESCRIPTION OF THE PRIOR ART

The Hoffman U.S. Pat. No. 80,350 shows a tanners hook that has a pivoting lever hook located on the end of a long pole. The tanners hooks is used to handle hides located in large vats.

The Strong U.S. Pat. No. 306,188 shows a typical window pole with a hook on the end for opening and lowering the upper sash of a window. The Strong pole is used with sliding sashes but could also be used to engage and rotate the eyelets on conventional blinds.

The Kehl U.S. Pat. No. 2,084,617 shows a pole with an off center hook on the end for use in opening or closing and electrical switch.

The Gustafson U.S. Pat. No. 2,542,665 shows a tree shaker that has a relatively large hook located on the end of a long pole.

The French U.S. Pat. No. 3,182,960 shows an electrician's wire fish pole for pulling electrical wires. The pole has a large hook and a light on the end of the pole to illuminate an interior space containing a wire to be engaged and pulled by the hook on the end of the pole.

The Crowley U.S. Pat. No. 3,323,826 shows an extendable pike pole for use by firemen. The pike pole is typically used to break through and tear away plaster or sheetrock walls to thereby exposed any fires behind the walls.

The Williams U.S. Pat. No. 3,936,088 shows a flexible tarpaulin handling pole that has two hooks on the end of the pole. One of the hooks faces downward and the other hook faces upward. The upward facing hook is used to lift the tarpaulin upward and the downward facing hook is used to engage an eyelet on the tarpaulin to pull the tarpaulin down.

The 1897 Great Britain Carr patent 27,822 shows an overhead picture hanging tool comprising a pole with one end of the pole having a spiral wire coil with an upward facing hook. Presumably, the upward facing wire hook engages a picture wire as the user lifts a picture to an overhead mounting position by raising the pole. Carr states that the purpose of the spiral in his wire coil is to permit the wire coil to be mounted on poles of different diameters. Consequently, as FIG. 2 shows, his wire coil may only partially grip the end of a pole. Carr also points out that it is the spring or elasticity in the coil of his wire that grips the pole to retain the wire coil on the pole. It is apparent that if Carr relies on the coil to produce a compressive force as one screws the spiral coil on to the pole, the wire coil becomes harder to screw on the pole since the compressive frictional force increases with each turn of the wire coil.

An upward projecting hook located on one end of the Carr coil permits a user to lift and hang pictures on a wall. Although Carr suggests his hook could have different shapes and that his tool could be used for different purposes, he does not show or describe such shapes or tools.

BRIEF SUMMARY OF THE INVENTION

Briefly, the present invention comprises a screw on, self locking, wire coil adaptor for converting a threaded broom handle or the like into a window pole for rotatingly driving an eyelet on an overhead window blind or the like. Once installed, the self locking adaptor engages the pole to prevent rotational disengagement of the wire coil even though the adaptor is rotationally connected to the pole. The wire coil is in the shape of a female thread so that the user can quickly and easily screw the wire coil onto the male threads on the end of a broom handle or the like. To attach the adaptor, one screws the wire coil on the end of a pole until a stop engages the end of the pole. The stop prevents further rotation of the wire coil. Once the wire coil is positioned on the pole, the user can engage a hook on the coil with the driving eyelet on a blind. Even though a rotational force is applied to the pole, the adaptor resists rotation in either direction with respect to the pole through the coaction of the adaptor and the pole. The stop prevents further rotational displacement of the wire coil with respect to the pole in one direction and a compressive force between the wire coil and the pole produced by the rotational pressure exerted on the pole and the hook prevents rotational displacement of the wire coil in the opposite direction.

DESCRIPTION OF THE PREFERRED EMBODIMENT

Figure 1:
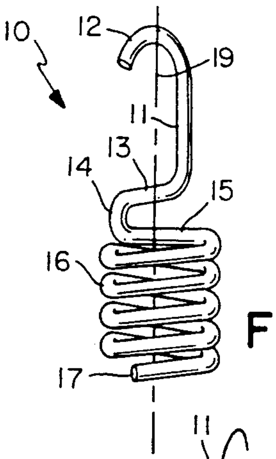
FIG. 1 shows a front elevation view of our self locking wire coil adaptor for converting an ordinary threaded broom handle or the like into a window pole for operating overhead blinds.

Referring to FIG. 1, reference numeral 10 generally identifies our screw on, self locking, wire coil adaptor 10. Adaptor 10 comprises a continuous, cylindrical, resilient wire formed into an open wire coil section 16 on one end and a C-shaped hook 12 on the opposite end. The open coil section 16 extends from end 17 of the wire to a diametrically extending transverse member 15 that forms an end stop. The other end of transverse member 15 smoothly connects to one end of an upward reverse curve section 14. The opposite end of reverse curve section 14 smmothly connects to a second diametrically extending transverse member 13 that extends above and partially along lower transverse member 15. Extending vertically upward and substantially parallel to a central axis 19 through coil 16 is a straight shank 11 with a downward pointing C-shaped hook 12 smoothly connected thereto.

Section 16 is formed in the shape of a female that smoothly mates with a male thread of similar size located on the end of a conventional broom handle or the like. The female threads on our wire coil are formed with the conventional clearance of male and female threads so that one can easily screw the coil section 16 onto the male threads without the assistance of any tools.

Figure 2:
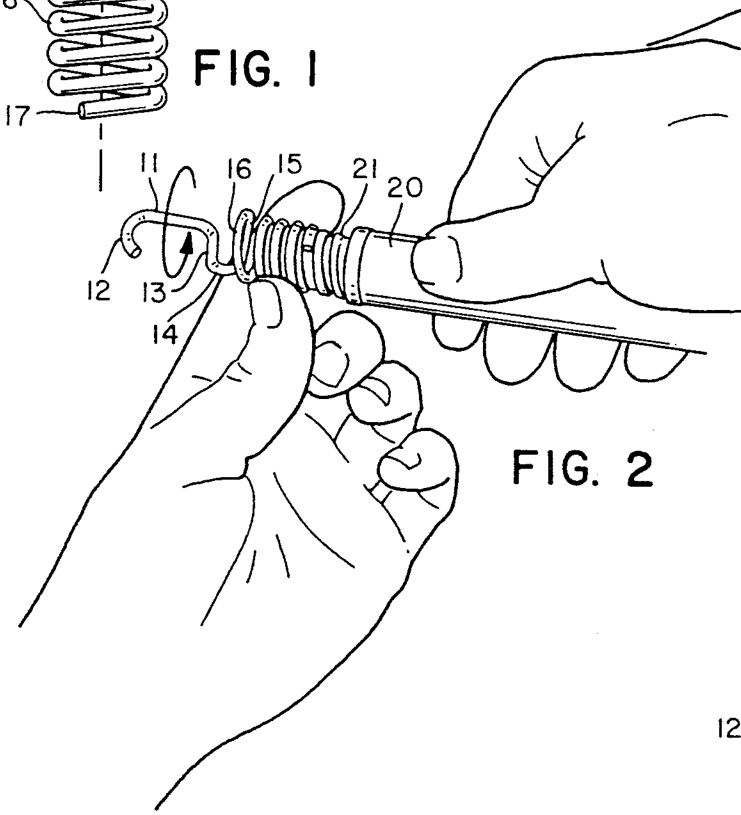
FIG. 2 shows a user inserting our wire coil adaptor onto male threads on the end of a pole.
Figure 4:
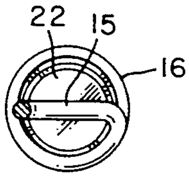
FIG. 4 shows a top sectional view of our wire coil adaptor located on the end of a pole.
Figure 3:
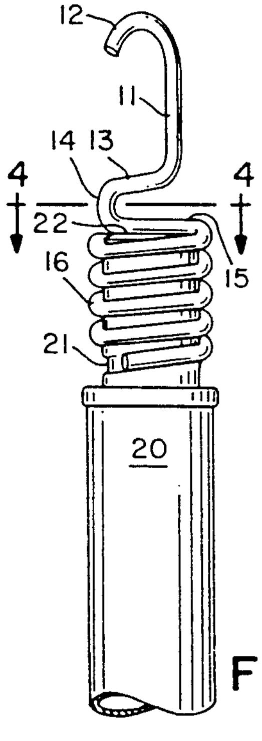
FIG. 3 shows a front elevation view of our wire coil adaptor located on the end of a pole.

FIG. 2 illustrates how easily a user can attach adaptor 10 to male threads 21 on the end of a pole 20. To attach adaptor 10, the user grasps pole 20 in one hand and with the finger and thumb of the opposite hand grasps coil 16 and then rotates wire coil 16 counter clockwise to screw adaptor 10 onto male thread 21. The operator continues to rotate wire coil 16 until a transverse member 15 abuts against an end 22 of pole 20. FIG. 3 illustrates adaptor 10 with transverse member 15 abutting against end 22 of pole 20. FIG. 4 also illustrates how transverse member 15 extend diametrically across end 22 of pole 20. As evident from the drawing, transverse member 15 provides a stop to prevent further counterclockwise rotation of coil 16 onto pole 20.

Once adaptor 10 is positioned with transverse member 15 resting on the end of pole 20, our adaptor self-locks to pole 20 to prevent rotational removal of adaptor 10 through hook 12. That is, if one attempts to apply either a clockwise or a counter clockwise rotational force to hook 21 coil 16 locks itself from rotation with respect to pole 20. The means for producing self-locking action in one direction is produced by transverse section 15 abutting against end 22 of pole 20 which prevents any further counter clockwise rotation of adaptor 10. The means for producing self-locking in the opposite direction occurs through the cantilevered relationship of hook 12 to coil 16. For example, if a user applies a clockwise rotation force on hook 12, the force is transmitter to coil 16 through shank 11, cantilevered transverse member 13, curved section 14, and transverse member 15. The force is not distributed uniformly across coil 16 but to the end of the coil 16 which pulls one end of coil 16 into greater pressure contact with male threads 21 than the other portions of coil 16. The coaction of the members 11, 13, 14 and 15 results in a compressive or binding action between resilient wire coil 16 and male threads 21. Consequently, the greater the rotational force applied to hook 12, the greater the binding force between coil 16 and male threads 21. In normal use this binding action produced by a rotational force on hook 12 sufficiently binds coil 16 to male threads 21 to prevent adaptor 10 from being unscrewed from pole 10 by solely applying rotational force on hook 12.

Thus, the combination of the stop 15 and the compressive grasping of male threads 21 by wire coil 16 provides an adaptor that can be screwed onto a male thread with finger pressure but once in place self-locks without any further action required by the user. Since the adaptor self-locks, the user can use our invention to rotate an eyelet with hook 12 on pole 20. It should be pointed out that although wire coil 16 normally can not be removed by applying a rotational force to hook 12, coil 16 can be removed from the male threads 21 if one grasps the wire coil 16 on opposite sides of the coil and applies a twisting force to diametrical opposite sides of coil 16.

It should be pointed out that in the preferred embodiment the diameter of coil 16 is uniform throughout and that one does not need to produce an interference fit between the female threads formed by coil 16 and the male threads in handle 20.

Thus, it will be envisioned that our self-locking adaptor can be readily attached to male threads on a pole and when used in the intended manner can not be rotationally removed through a rotational force applied to hook 12.

Figure 5:
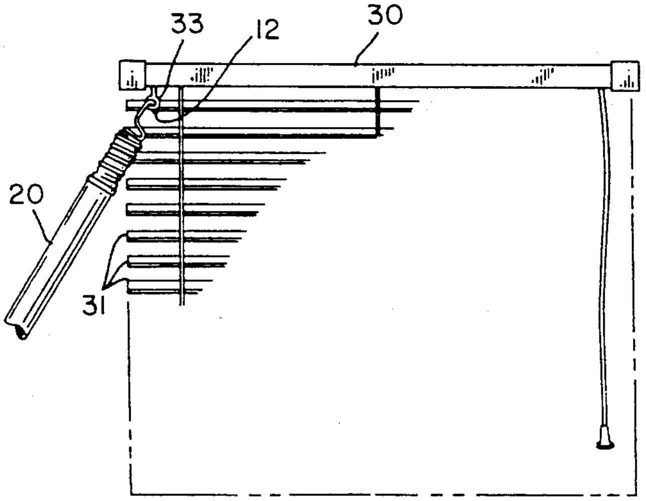
FIG. 5 shows a window pole with our adaptor operating an overhead blind.

FIG. 5 illustrates how pole 20 can be used to open or close blinds 31 by connecting hook 12 to eyelet 33 projecting from blind housing 30. To close the blinds 31, the user rotates pole 20 along a central axis extending longitudinally along pole 20. The rotational force is applied to eyelet 33 through the C-shaped hook 12 that extends outward from pole 20. Since adaptor 10 self-locks to pole 20, the user can rotate eyelet 33 without concern that adaptor 10 will unscrew during use. While the use of the invention as part of a window pole is described, other uses of our invention with poles may be found once the present invention is appreciated.

We claim:

1. A screw on, self-locking adaptor for converting a cylindrical pole into a window pole or the like to permit a user to open or close window blinds through axial rotation of the window pole comprising:

a cylindrical coil having a central axis and a first end, said cylindrical coil having the shape of a female thread to permit said coil to be screwed onto male threads on a cylindrical pole;

a first member connected to said first end of said coil, said first member extending at least partially across said coil to form a stop to limit how far said cylindrical coil can be screwed onto a cylindrical pole;

a second member, said second member connected to said first member, said second member extending at least partially across said coil; and a third member connected to said member, said third member extending substantially parallel to said central axis, said third member including a C-shaped hook to rotationally engage a rotatable eyelet, said first member, said second member and said third member coacting to produce a binding action between said coil and male threads on a pole when a rotational force is applied to said third member to therby prevent said coil from being unscrewed from male threads on a pole so that a user can apply either a clockwise or counter-clockwise rotational force to a pole connected to said adaptor to thereby said eyelet without causing said adaptor to rotate with respect to the pole.

2. The adaptor of claim 1 wherein said coil comprises a wire coil.

3. The adaptor of claim 2 wherein said wire coil is made of a resilient material.

4. The adaptor of claim 3 wherein said adaptor comprises a single continuous wire.

5. The adaptor of claim 4 wherein said third member includes a shank that extends substantially coaxial with said pole.

6. A tool for applying a rotational force to an object comprising:

an elongated cylindrical pole having a first end with a male thread located on the end of said pole;

a wire coil member formed in the shape of a female thread, said female thread forming mating engagement with said male thread with said wire coil member operable for screwing on the male thread through rotation of said wire coil member, said wire coil member having a hook connected thereto and extending axially outward from said wire coil member for applying a rotational force to an object, said wire coil member having means to produce a binding action between said male thread and said wire coil to prevent rotational displacement of said wire coil member with respect to said pole when a rotational force is applied to said hook to thereby permit a user to use said pole to apply rotational force to an object.

7. The tool of claim 6 wherein said means includes a stop for engaging said pole.

8. The tool of claim 7 wherein said wire coil member includes a cantilevered C-shaped hook.

9. An adaptor for converting a pole into a tool comprising:

a cylindrical wire coil having a central axis, said wire coil having the shape of a female thread to permit said wire coil to be screwed onto a male thread on a pole, said wire coil having an end;

a hook having a shank, said shank extending substantially coaxially along said axis of said coil; and locking means, said locking means including a stop to prevent rotation of said cylindrical coil in a first direction and further means connected to said shank to form a binding action between said wire coil and a male thread on a pole to prevent rotation of said coil when said coil is on a male thread of a pole.

10. The adaptor of claim 9 wherein said locking means comprises a member extending across said coil to prevent further rotational engagement of said coil with a male thread.

11. The adaptor of claim 10 wherein said locking means includes a member cantileverly connecting said hook to said coil so that when a rotational force is applied to said hook, said coil compresses to grip a male thread located therein on thereby prevent rotation of said adaptor with respect to a male thread located in said adaptor.

12. An adaptor for converting a pole into a tool comprising:

a cylindrical wire coil having a central axis, said coil having the shape of a female thread of a predetermined size to permit said wire coil to be screwed onto a male thread of the same predetermined size on a pole, said wire coil having a first end for manipulating an object, said end extending outward from said coil so that when said coil is screwed onto a male thread of a pole, said wire coil and said pole threadingly engage each other to produce a tool that permits a user to grasp a pole and manipulate objects with said end on said adaptor: and first locking means for preventing further rotation of said wire coil in a first direction and second locking means for preventing rotation of said wire coil in a second direction so that said cylindrical wire coil can be locked to a pole solely through the coaction of said cylindrical wire coil with a male thread.

* * * * *